United States Patent
Warren et al.

(10) Patent No.: US 12,455,213 B2
(45) Date of Patent: Oct. 28, 2025

(54) MEASUREMENT SYSTEM HAVING A CAPACITANCE PROBE AND AN OPTICAL PROBE

(71) Applicant: Raytheon Technologies Corporation, Farmington, CT (US)

(72) Inventors: Eli Warren, Wethersfield, CT (US); Bryan J. Hackett, Berlin, CT (US)

(73) Assignee: RTX CORPORATION, Farmington, CT (US)

( * ) Notice: Subject to any disclaimer, the term of this patent is extended or adjusted under 35 U.S.C. 154(b) by 346 days.

(21) Appl. No.: 18/104,756

(22) Filed: Feb. 1, 2023

(65) Prior Publication Data
US 2024/0255383 A1  Aug. 1, 2024

(51) Int. Cl.
*G01M 15/14* (2006.01)
*G01D 5/24* (2006.01)
*G01D 5/26* (2006.01)

(52) U.S. Cl.
CPC .............. *G01M 15/14* (2013.01); *G01D 5/24* (2013.01); *G01D 5/268* (2013.01)

(58) Field of Classification Search
CPC .......... G01M 15/14; G01D 5/24; G01D 5/268
See application file for complete search history.

(56) References Cited

U.S. PATENT DOCUMENTS

| | | | | |
|---|---|---|---|---|
| 4,384,819 A | * | 5/1983 | Baker | G01S 13/36 415/118 |
| 4,666,297 A | * | 5/1987 | Suarez-Gonzalez | G01J 5/0801 374/127 |
| 5,349,850 A | * | 9/1994 | Young | G02B 6/3624 73/112.01 |
| 8,606,541 B2 | | 12/2013 | Platt | |
| 8,687,206 B2 | | 4/2014 | Hockaday | |
| 9,279,336 B2 | | 3/2016 | Warren | |
| 9,316,479 B2 | | 4/2016 | Warren | |
| 9,530,209 B2 | | 12/2016 | Hatcher, Jr. | |
| 10,670,452 B2 | | 6/2020 | Leroux | |
| 10,774,680 B1 | | 9/2020 | Schleif | |
| 10,775,269 B2 | | 9/2020 | Gysling | |
| 10,794,795 B2 | | 10/2020 | Warren | |
| 2004/0061043 A1 | * | 4/2004 | Kline | G01F 23/266 250/227.21 |
| 2008/0218181 A1 | * | 9/2008 | Ducheminsky | G01B 7/285 356/625 |

(Continued)

OTHER PUBLICATIONS

Kam Chana, "Combined Blade Vibration and Surge/Stall Sensor for Gas Turbine Blade Health Management", Oxford Thermo-Fluids Institute, Department of Engineering Science, University of Oxford, United Kingdom, S&T Organization, STO-MP-AVT-309, 7-1-7-14.

*Primary Examiner* — Eric S. McCall
(74) *Attorney, Agent, or Firm* — Getz Balich LLC

(57) ABSTRACT

A measurement system is provided that includes a probe assembly. The probe assembly includes a capacitance probe and an optical probe. The capacitance probe includes a capacitance sensor that forms a sensor face of the probe assembly. An aperture projects axially through the capacitance sensor to the sensor face. The optical probe is configured with an optical line of sight through the aperture into a volume adjacent the sensor face.

20 Claims, 7 Drawing Sheets

(56) References Cited

U.S. PATENT DOCUMENTS

| | | | | |
|---|---|---|---|---|
| 2011/0231171 A1* | 9/2011 | Jousselin | ................ | G06F 30/20 |
| | | | | 703/7 |
| 2012/0312099 A1* | 12/2012 | Russhard | .............. | G01H 1/003 |
| | | | | 73/660 |
| 2014/0270625 A1* | 9/2014 | Warren | ................... | G01L 1/242 |
| | | | | 385/12 |
| 2015/0092039 A1* | 4/2015 | Ruhge | ................ | G01N 21/8803 |
| | | | | 348/82 |
| 2015/0300920 A1* | 10/2015 | DeAscanis | ........... | G01M 15/14 |
| | | | | 356/614 |
| 2015/0341600 A1* | 11/2015 | Hatcher, Jr. | ............ | H04N 23/50 |
| | | | | 348/82 |
| 2018/0209296 A1* | 7/2018 | DeAscanis | ............ | F01D 21/003 |
| 2019/0257705 A1* | 8/2019 | Warren | .................... | F02K 3/06 |
| 2021/0102901 A1* | 4/2021 | Budnicki | ........... | G01N 21/7703 |
| 2022/0403787 A1* | 12/2022 | Schleif | .................... | G01J 1/044 |
| 2024/0310246 A1* | 9/2024 | Warren | ................. | G01B 11/14 |
| 2024/0310599 A1* | 9/2024 | Hackett | ................... | G02B 6/50 |

* cited by examiner

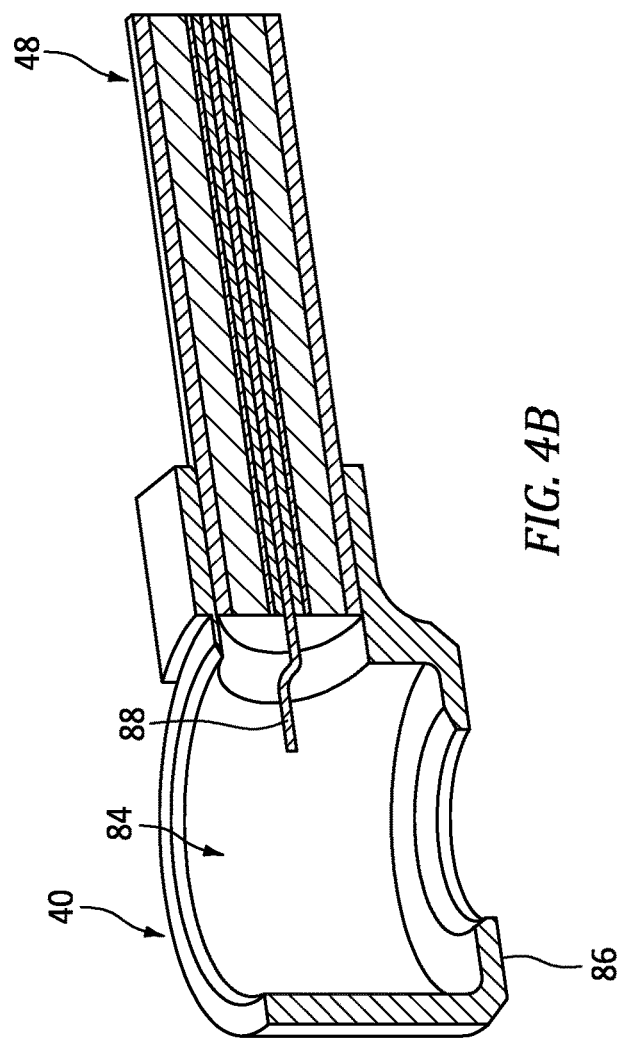
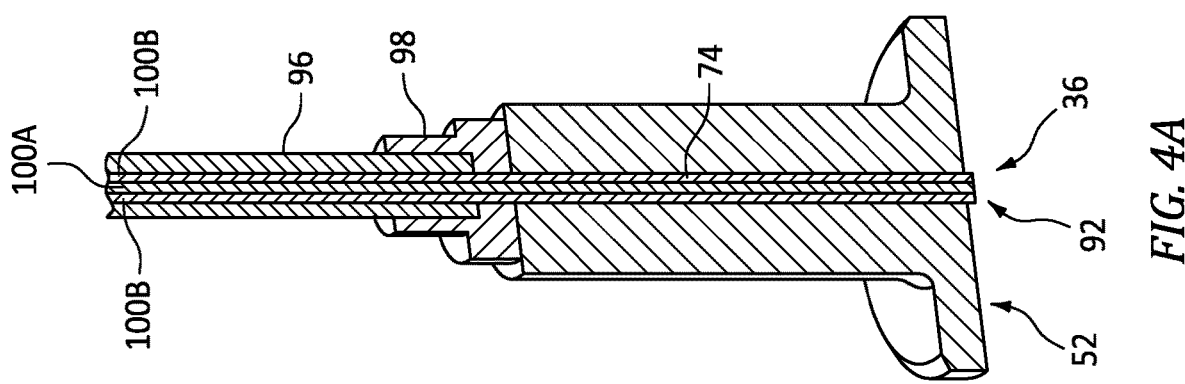
FIG. 4B
FIG. 4A

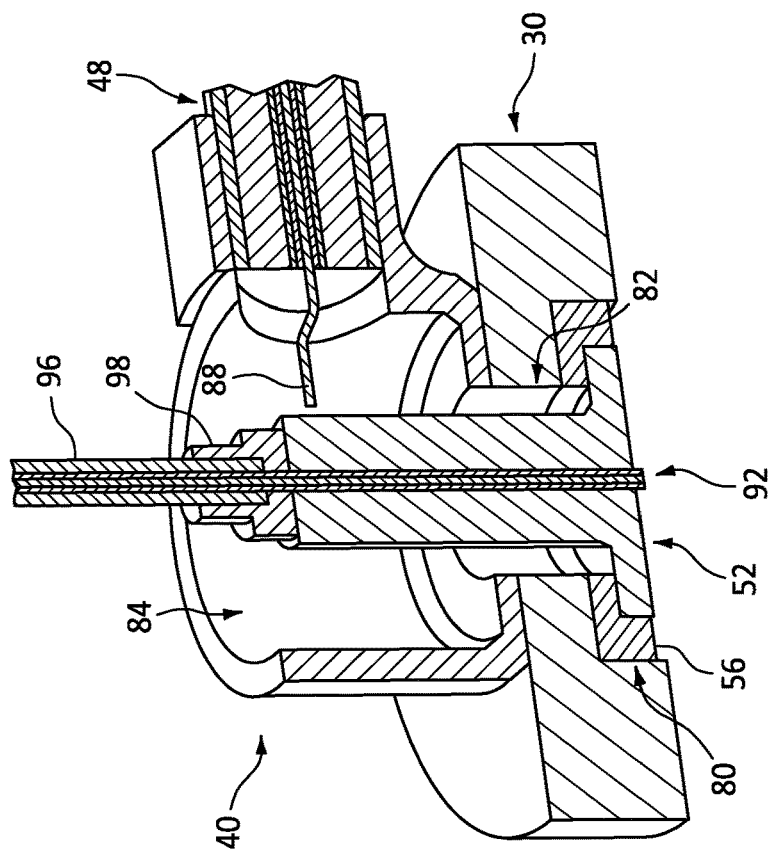
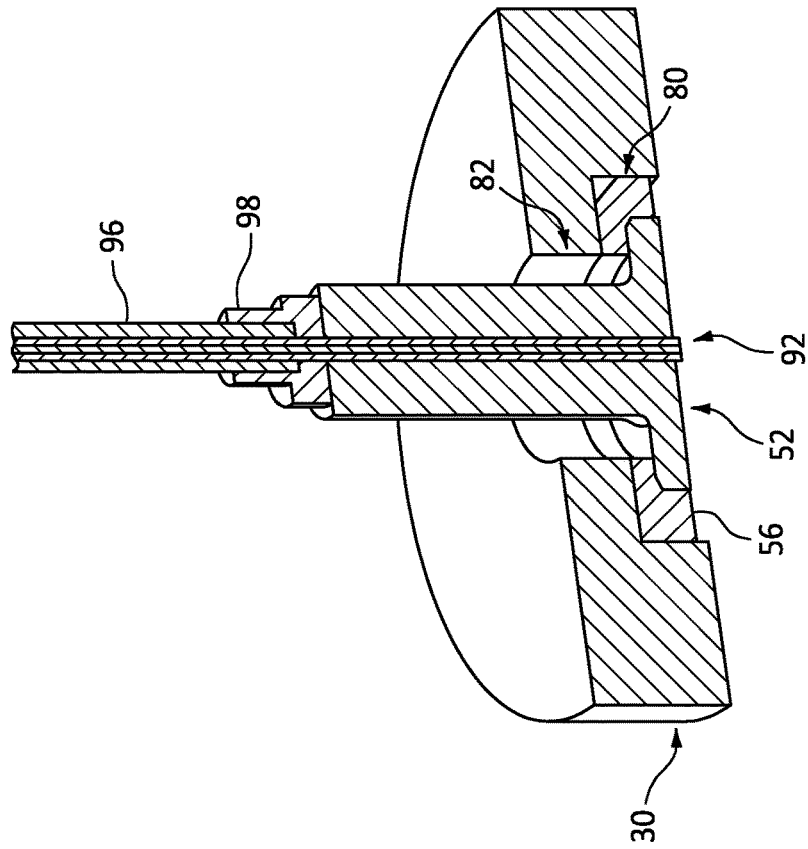
FIG. 4D
FIG. 4C

MEASUREMENT SYSTEM HAVING A CAPACITANCE PROBE AND AN OPTICAL PROBE

BACKGROUND OF THE DISCLOSURE

1. Technical Field

This disclosure relates generally to measuring multiple operational parameters of, for example, a gas turbine engine rotor.

2. Background Information

Systems are known in the art for measuring operational parameters of a rotor within a gas turbine engine. Such systems include capacitance measurement systems and optical measurement systems. While these known measurement systems have various benefits, there is still room in the art for improvement. There is a need in the art, in particular, for a measurement system which can measure multiple operational parameters.

SUMMARY OF THE DISCLOSURE

According to an aspect of the present disclosure, a measurement system is provided that includes a probe assembly. The probe assembly includes a capacitance probe and an optical probe. The capacitance probe includes a capacitance sensor that forms a sensor face of the probe assembly. An aperture projects axially through the capacitance sensor to the sensor face. The optical probe is configured with an optical line of sight through the aperture into a volume adjacent the sensor face.

According to another aspect of the present disclosure, another measurement system is provided that includes a blade tip clearance measurement system and a blade time of arrival measurement system. The blade tip clearance measurement system includes a first probe. The first probe includes a first probe sensor that forms a sensor face. An aperture projects axially through the first probe sensor to the sensor face. The blade time of arrival measurement system includes a second probe. The second probe projects through the aperture to a volume adjacent the sensor face.

According to still another aspect of the present disclosure, another measurement system is provided that includes a probe assembly. The probe assembly includes a capacitance probe, an optical probe and a housing structure. The capacitance probe includes a capacitance sensor housed within the housing structure. The optical probe includes an optical fiber. An end portion of the optical fiber is housed with the capacitance sensor within the housing structure. The capacitance sensor may circumscribe the end portion of the optical fiber.

The first probe may be configured as a capacitance probe. The first probe sensor may be configured as a capacitance sensor.

The second probe may be configured as an optical probe. The optical probe may include an optical fiber projecting axially through the aperture and across the first probe sensor.

The measurement system may also include a blade tip clearance measurement system that includes the capacitance probe.

The measurement system may also include a blade time of arrival measurement system that includes the optical probe.

The aperture may be coaxial with the capacitance sensor.

The optical probe may include an optical fiber at least partially defining the optical line of sight into the volume. The optical fiber may be disposed within the aperture. The optical fiber may project axially across the capacitance sensor.

The optical probe may also include a second optical fiber at least partially defining a second optical line of sight into the volume. The second optical fiber may be disposed within the aperture and adjacent the optical fiber.

The measurement system may also include an optical sheath covering a portion of the optical fiber. The optical fiber may project axially out from the optical sheath and into the capacitance sensor.

The measurement system may also include a mount fixing the optical sheath to the capacitance sensor. The mount may electrically isolate the optical sheath from the capacitance sensor.

The measurement system may also include a bladed rotor and a duct wall circumscribing the bladed rotor and forming an outer peripheral boundary of the volume. The probe assembly may project through a port in the duct wall to the volume.

The measurement system may also include a wall forming a peripheral boundary of the volume. The probe assembly may project through a port in the wall to the volume. The capacitance sensor may be attached to the wall.

The capacitance sensor may be clamped onto the wall.

The measurement system may also include an insulator electrically decoupling the capacitance sensor from the wall.

The measurement system may also include a nut thread onto a threaded shaft of the capacitance sensor. The wall may be captured axially between a head of the capacitance sensor and the nut.

The measurement system may also include an electrical lead electrically coupled to the capacitance sensor through the nut.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIGS. 4A-F are partial perspective cutaway illustrations depicting an exemplary sequence for assembling the probe assembly.

DETAILED DESCRIPTION

Figure 1:
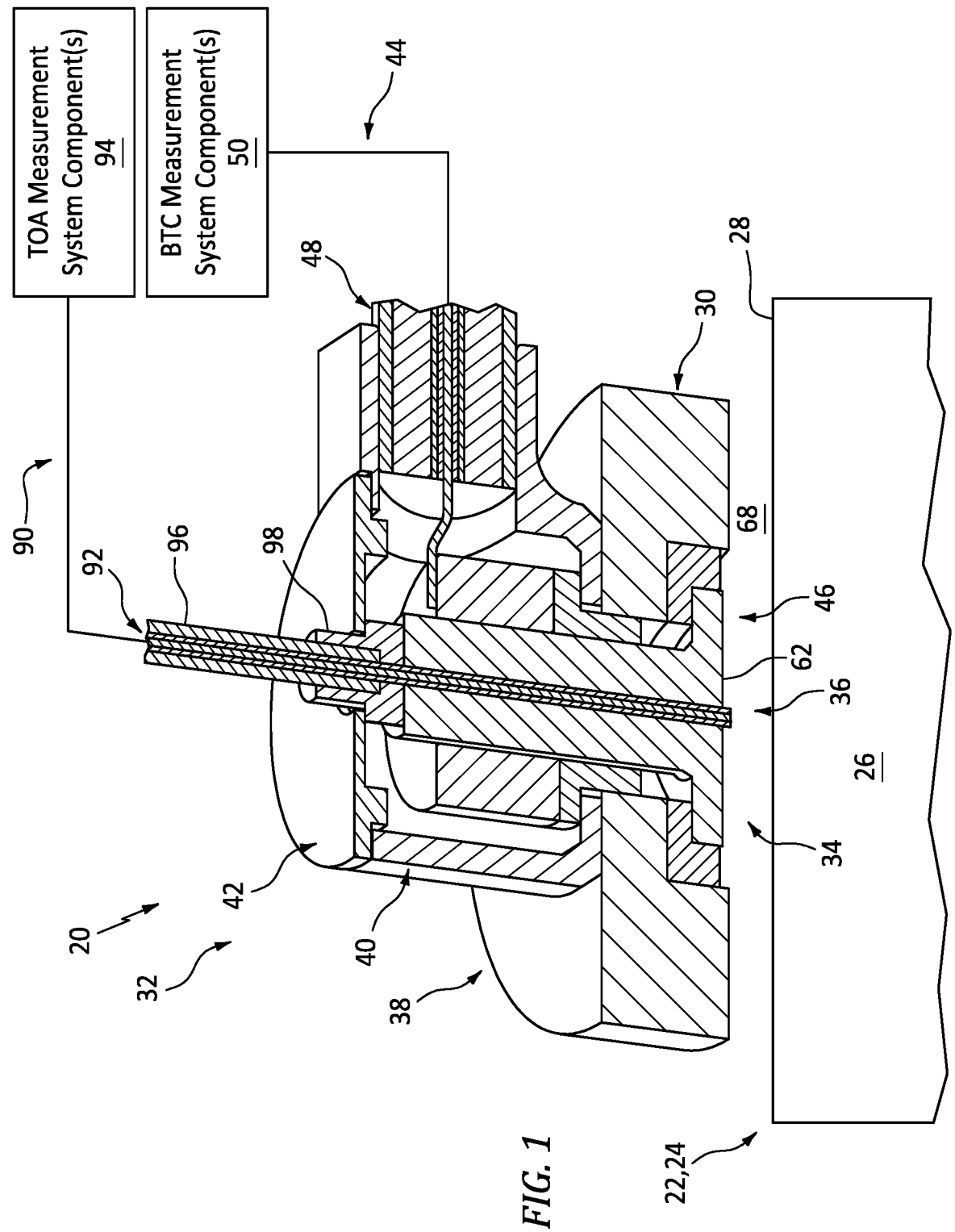
FIG. 1 is a perspective cutaway and schematic illustration of a measurement system.

FIG. 1 illustrates a system 20 for measuring multiple operational parameters of a rotor 22. This rotor 22 may be a bladed rotor 24 for a gas turbine engine. Examples of the bladed rotor 24 include, but are not limited to, a propulsor rotor (e.g., a fan rotor), a compressor rotor or any other ducted rotor within and/or rotatably driven by the gas turbine engine. The present disclosure, however, is not limited to measuring operational parameters for a bladed rotor, nor to measuring operational parameters for gas turbine engine applications. The measurement system 20, for example, may alternatively be configured to measure operational parameters of any rotor in or coupled to various other types of rotational equipment such as, but not limited to, a reciprocating piston engine, a rotary engine, an electric motor and the like. However, for ease of description, the measurement system 20 is described below with reference to the bladed rotor 24.

The operation parameters may include a blade tip clearance (BTC) and a blade time of arrival (BTOA) for one or more rotor blades 26 of the bladed rotor 24. The blade tip clearance may be indicative of a (e.g., minimum or average) radial distance between a tip 28 of one of the rotor blades 26 and a duct wall 30 (a select portion of which shown in figures for clarity of illustration) circumscribing and housing the bladed rotor 24. The blade time of arrival may be indicative of a point in time when the tip 28 (or another portion) of one of the rotor blades 26 arrives at or crosses (e.g., passes) a measurement location. The present disclosure, however, is not limited to such exemplary operational parameters.

The measurement system 20 includes a probe assembly 32. This probe assembly 32 includes a capacitance probe 34, an optical probe 36 and a probe housing structure 38. The housing structure 38 of FIG. 1 includes a portion of the duct wall 30 (or another fixed base structure), a probe housing 40 and a housing cap 42.

The capacitance probe 34 is included as part of a first measurement subsystem 44 of the measurement system 20. This first measurement subsystem 44 may be configured as a blade tip clearance (BTC) measurement system for measuring the blade tip clearance. However, it is contemplated the capacitance probe 34 may also or alternatively be included as part of one or more other measurement system subsystems for measuring one or more other operational parameters associated with the bladed rotor 24. The capacitance probe 34 of FIG. 1 includes a capacitance sensor assembly 46 and an electrical conduit 48 (e.g., a triaxial lead or a coaxial lead, multiple conductors within a common outer sheath, etc.) placing the capacitance sensor assembly 46 in signal communication with one or more other components 50 (e.g., a signal transducer, a processor, etc.) of the first measurement subsystem 44.

Figure 2:
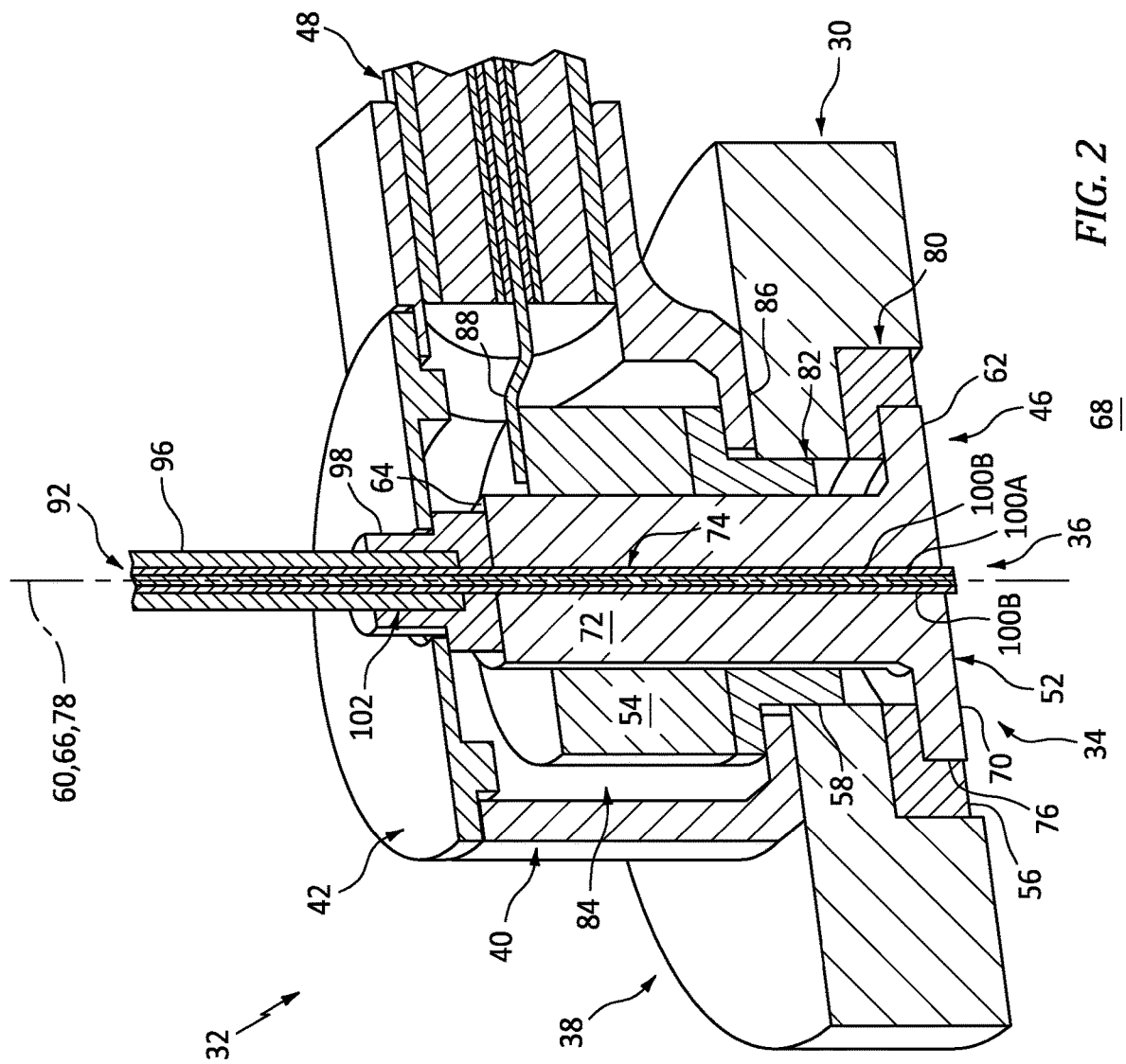
FIG. 2 is a perspective cutaway illustration of a portion of a probe assembly.

Referring to FIG. 2, the capacitance sensor assembly 46 includes a capacitance sensor 52 and a sensor mount 54; e.g., a nut. The capacitance sensor assembly 46 of FIG. 2 also includes one or more sensor insulators 56 and 58; e.g., insulating washers, bushings, grommets, etc.

The capacitance sensor 52 is configured as an electrically conductive capacitor member. This capacitance sensor 52 extends axially along a centerline axis 60 of the capacitance sensor 52 between a sensor face 62 of the capacitance sensor 52 and a base end 64 of the capacitance sensor 52, which centerline axis 60 may be parallel (e.g., coaxial) with a centerline axis 66 of the probe assembly 32. The sensor face 62 of FIG. 2 is disposed adjacent a volume 68 within the duct wall 30; e.g., a flowpath in which the bladed rotor 24 and its rotor blades 26 of FIG. 1 are disposed. Briefly, a radial outer peripheral boundary of the volume 68 is formed by an interior of the duct wall 30 as well as the sensor face 62 of FIG. 2. The capacitance sensor 52 includes a sensor head 70 and a sensor base 72. The capacitance sensor 52 also includes an internal sensor aperture 74; e.g., a bore, a through-hole, etc.

Figure 3:
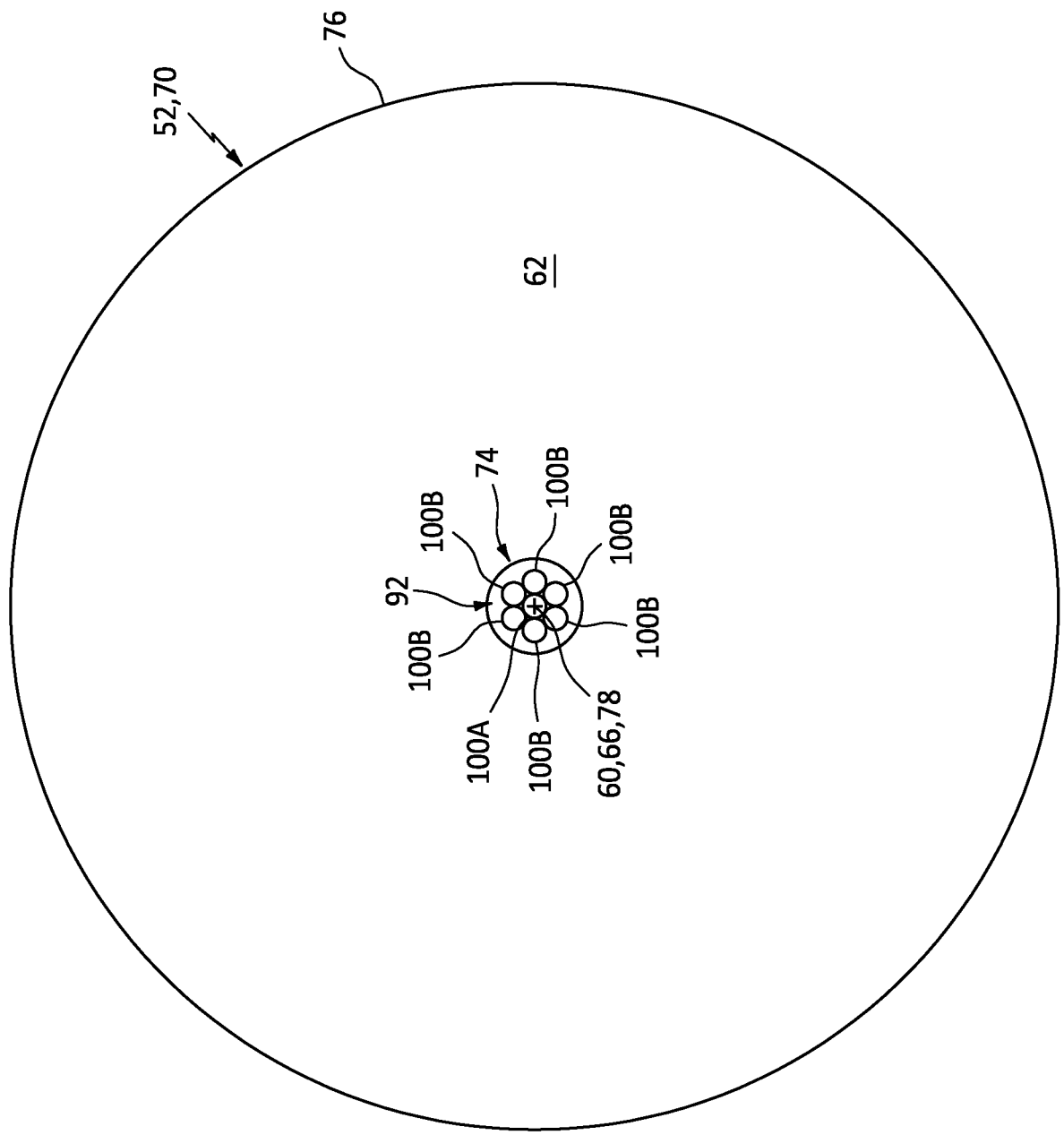
FIG. 3 is an illustration of a sensor face of the probe assembly.

The sensor head 70 may be configured as a capacitor plate. The sensor head 70 of FIG. 2, for example, is disposed at and may completely (or at least partially) form the sensor face 62. The sensor head 70 projects radially out from the sensor base 72 to a distal outer end 76 of the sensor head 70. Referring to FIG. 3, the sensor head 70 and its sensor face 62 have an annular (e.g., circular ring shaped) geometry when viewed, for example, in a reference plane perpendicular to the centerline axis 60, 66. Of course, in other embodiments, it is contemplated the sensor head 70 and its sensor face 62 may have other annular geometries; e.g., an annular rectangular or other polygonal geometry.

Referring to FIG. 2, the sensor base 72 is connected to (e.g., formed integral with) the sensor head 70. The sensor base 72 projects axially along the centerline axis 60 out from the sensor head 70 to the sensor base end 64. At least an end portion or an entirety of an axial length of the sensor base 72 may be threaded. The sensor base 72, for example, may be configured as a threaded shaft.

The sensor aperture 74 extends axially along the centerline axis 60 through the capacitance sensor 52. More particularly, the sensor aperture 74 projects axially through the sensor base 72 from its sensor base end 64 to the sensor head 70. The sensor aperture 74 further projects axially through the sensor head 70 from the sensor base 72 to the sensor face 62. A centerline axis 78 of the sensor aperture 74 may be parallel (e.g., coaxial) with the centerline axis 60.

The capacitance sensor 52 is attached to the housing structure 38 using the sensor mount 54. The sensor head 70 of FIG. 2, for example, is received within a receptacle 80 (e.g., a counterbore) in the housing structure 38 and its duct wall 30. Here, the capacitance sensor 52 and its sensor head 70 are electrically decoupled (e.g., isolated) from the housing structure 38 and its duct wall 30 by the inner sensor insulator 56. More particularly, the inner sensor insulator 56 is arranged axially between the sensor head 70 and an annular shelf of the duct wall 30. The inner sensor insulator 56 is also arranged radially between the sensor head 70 and an outer sidewall of the receptacle 80. The sensor base 72 projects axially out from the sensor head 70, through a port 82 (e.g., a bore) in the housing structure 38, and into an internal cavity 84 of the probe housing 40. The sensor mount 54 of FIG. 2 is mated with (e.g., threaded onto) the sensor base 72, which captures a portion of the housing structure 38 (e.g., the duct wall 30 and a bottom 86 of the probe housing 40) axially between the sensor head 70 and the sensor mount 54. The capacitance sensor 52 may thereby be clamped (and/or otherwise attached) to the housing structure 38. Here, the capacitance sensor 52 and its members 70 and 72 are electrically decoupled from the housing structure 38 and its members 30 and 40 by the outer sensor insulator 58. More particularly, the outer sensor insulator 58 is arranged axially between the sensor mount 54 and the probe housing bottom 86. The outer sensor insulator 58 is also arranged radially between the sensor base 72 and an outer sidewall of the port 82.

An end portion of the electrical conduit 48 extends into the probe housing 40, for example, in a generally radial direction to the centerline axis 60 and/or in a direction substantially parallel to an exterior of the duct wall 30. An interior conductor 88 (e.g., a central wire) of the electrical conduit 48 projects into the internal cavity 84 of the probe housing 40 and is electrically coupled to the capacitance sensor 52. An end of the interior conductor 88, for example, may be bonded (e.g., welded, brazed, soldered, etc.) to the sensor mount 54, where the sensor mount 54 electrically couples the interior conductor 88 to the capacitance sensor 52.

Referring to FIG. 1, the optical probe 36 is included as part of a second measurement subsystem 90 of the measurement system 20, which second measurement subsystem 90 may be of a different type and/or configuration than the first measurement subsystem 44. This second measurement subsystem 90 may be configured as a blade time of arrival (BTOA) measurement system for measuring the blade time of arrival. However, it is contemplated the optical probe 36 may also or alternatively be included as part of one or more other measurement system subsystems for measuring one or more other operational parameters associated with the bladed rotor 24. The optical probe 36 of FIG. 1 includes sensor optics 92 in signal communication with one or more other components 94 (e.g., a light emission device such as an LED, a light sensing device such as a light receptor, a processor, etc.) of the second measurement subsystem 90. The optical probe 36 also includes an optical sheath 96 (e.g., hypo-tubing, insulative tubing, etc.) and an insulating mount 98 (e.g., a support insulator).

Referring to FIG. 3, the sensor optics 92 may include a bundle of one or more optical fibers 100A and 100B (generally referred to as "100"). The optical fiber 100A may be configured for directing light into the volume 68. The optical fibers 100B may be configured for receiving light from the volume 68. Here, the optical fiber 100A is centered within the bundle and the other optical fibers 100B are distributed circumferentially about the optical fiber 100A. The present disclosure, however, is not limited to such an exemplary sensor optics arrangement.

Referring to FIG. 2, an external portion of the sensor optics 92 is housed within (e.g., covered by) the optical sheath 96. An internal portion of the sensor optics 92 projects axially out of the optical sheath 96 and into the sensor aperture 74. This internal portion of the sensor optics 92 and its optical fibers 100 extend axially through the sensor aperture 74 to the sensor face 62 and/or the volume 68. Each optical fiber 100 may thereby define an optical line of sight axially through the sensor aperture 74 (e.g., across the capacitance sensor 52) and into the volume 68 adjacent the sensor face 62. The sensor optics 92 and one or more or all of its optical fibers 100 may be bonded (e.g., adhered) to the capacitance sensor 52 within the sensor aperture 74.

The insulating mount 98 may fix the optical sheath 96 to the capacitance sensor 52 at the sensor base end 64. More particularly, the insulating mount 98 may be bonded (or otherwise attached) the capacitance sensor 52 at the sensor base end 64. The optical sheath 96 projects axially into a receptacle 102 (e.g., a counterbore) in the insulating mount 98. The optical sheath 96 is bonded (or otherwise attached) to the insulating mount 98. Here, if the optical sheath 96 is made from a conductive material, the insulating mount 98 electrically decouples the optical sheath 96 from the capacitance sensor 52. The insulating mount 98, for example, is arranged axially between the optical sheath 96 and the sensor base end 64.

The housing cap 42 is bonded or otherwise attached to the probe housing 40. The probe assembly members 48, 52, 54, 56, 58, 88, 92, 96, 98 and 100 may thereby be (e.g., at least partially or completely) contained within the housing structure 38. Further containment may be provided by using potting material at interfaces between adjacent members. For example, the potting material may seal gaps between the housing cap 42 and the probe housing 40. The potting material may also or alternatively seal gaps between the housing cap 42 and the insulating mount 98. Of course, the potting material and/or other sealants may also or alternatively be used to seal one or more other gaps, interfaces, etc. of the probe assembly 32.

The probe assembly 32 of FIG. 2 facilitates arranging multiple different probes at a common location along the duct wall 30. With such an arrangement, multiple probe assemblies 32 and, thus, multiple capacitance probes 34 and multiple optical probes 36 may be provided for monitoring the same bladed rotor 24. This may increase measurement system accuracy as well as provide redundancy. By contrast, if the capacitance probes 34 and the optical probes 36 were discretely arranged, only half the number of probes could be utilized when utilizing the same locations as the multiple probe assemblies 32.

Figure 4F:
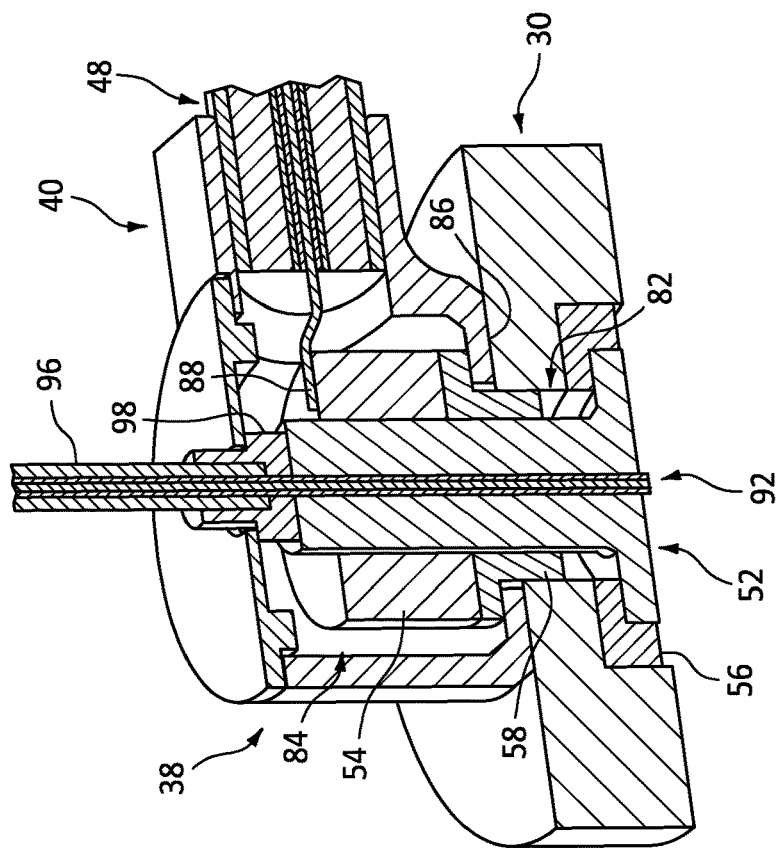
Figure 4E:
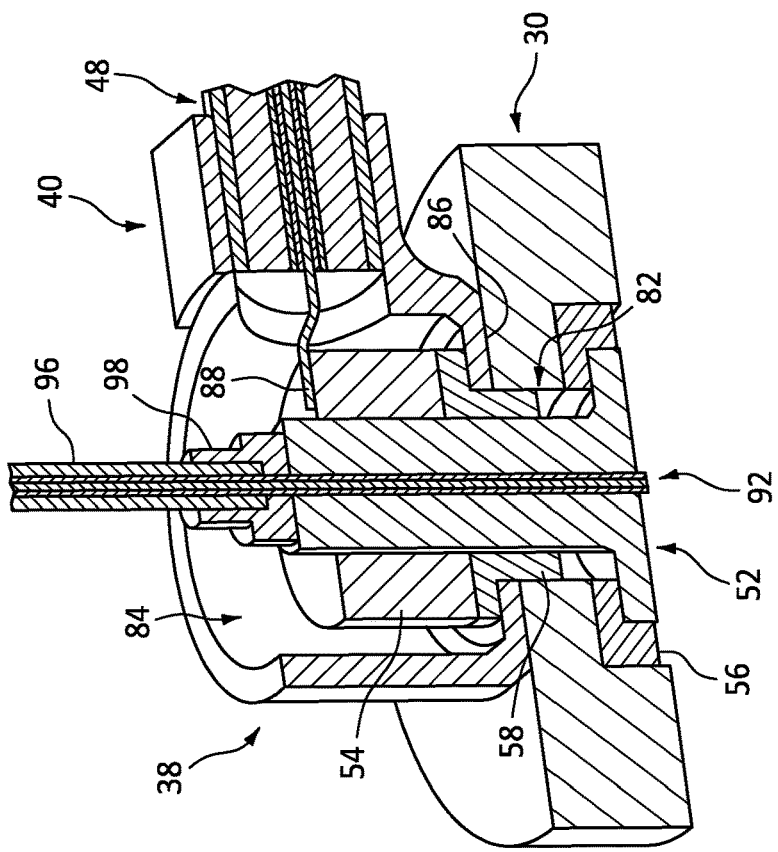

FIGS. 4A-F illustrate an exemplary sequence for assembling the probe assembly 32 of FIG. 2. Referring to FIG. 4A, the optical probe 36 is assembled. The optical sheath 96, for example, may be bonded (e.g., brazed) to the insulating mount 98. The optical fibers 100 are routed through the optical sheath 96 and the insulating mount 98 and inserted into the capacitance sensor 52. The optical fibers 100 may be bonded (e.g., glued) to the capacitance sensor 52. Referring to FIG. 4B, the electrical conduit 48 is assembled with the probe housing 40. Referring to FIG. 4C, the capacitance sensor 52 is mated with the inner sensor insulator 56 and the duct wall 30. Referring to FIG. 4D, the probe housing 40 is arranged with the duct wall 30 such that the capacitance sensor 52 projects axially into the internal cavity 84. Referring to FIG. 4E, the outer sensor insulator 58 and the sensor mount 54 are mated with the capacitance sensor 52, and the capacitance sensor 52 is attached to the housing structure 38. Referring to FIG. 4F, the housing cap 42 is bonded (e.g., welded) to the probe housing 40 to enclose the capacitance sensor 52 within the housing structure 38. The present disclosure, however, is not limited to the foregoing exemplary assembly sequence.

Figure 5:
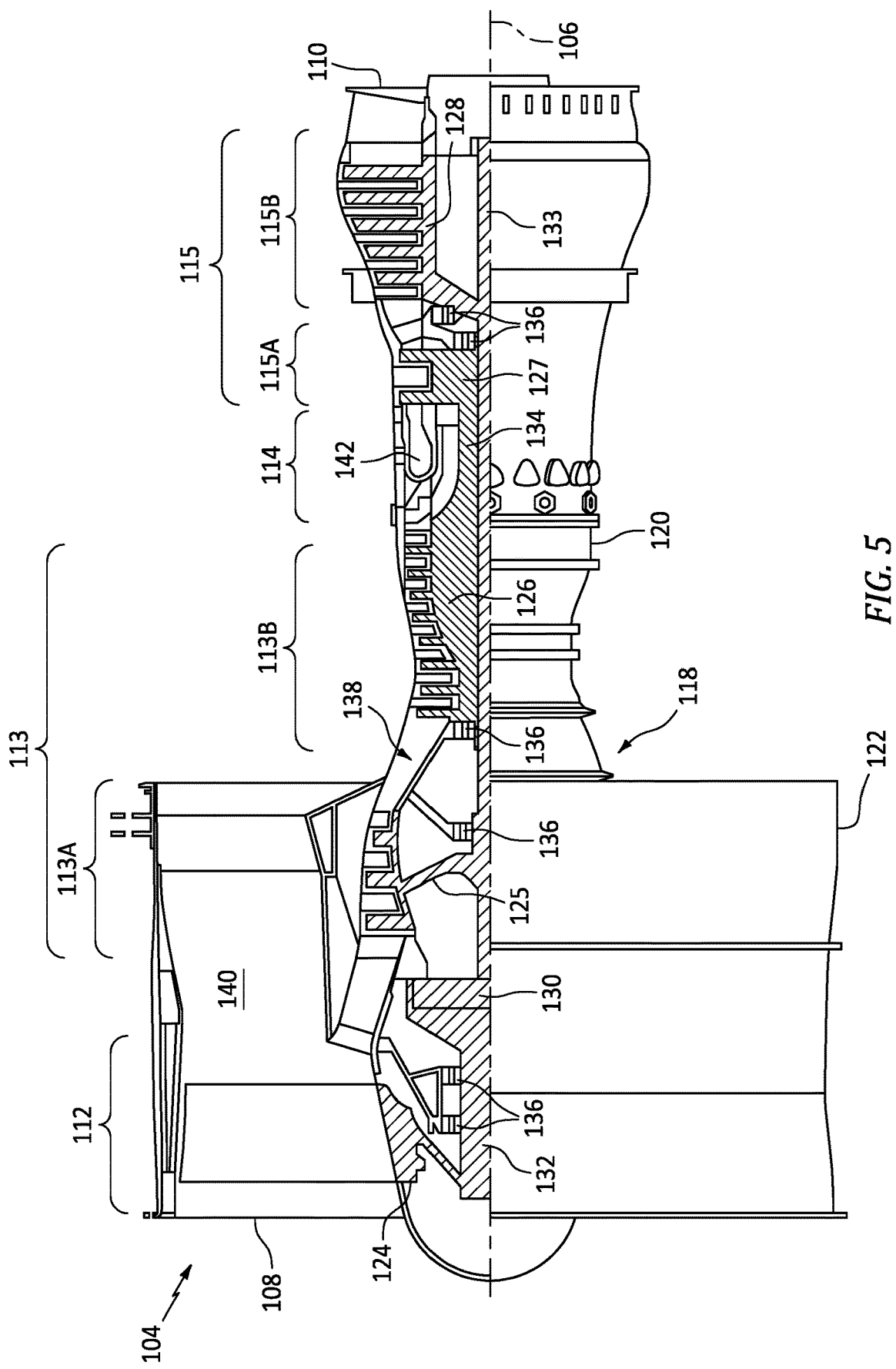
FIG. 5 is a side cutaway and schematic illustration of a geared turbine engine.

FIG. 5 illustrates a gas turbine engine 104 with which the measurement system 20 of FIG. 1 may be configured. The turbine engine 104 extends along an axial centerline 106 between an upstream airflow inlet 108 and a downstream airflow exhaust 110. The turbine engine 104 includes a fan section 112, a compressor section 113, a combustor section 114 and a turbine section 115. The compressor section 113 includes a low pressure compressor (LPC) section 113A and a high pressure compressor (HPC) section 113B. The turbine section 115 includes a high pressure turbine (HPT) section 115A and a low pressure turbine (LPT) section 115B.

The engine sections 112-115B are arranged sequentially along the axial centerline 106 within an engine housing 118. This engine housing 118 includes an inner case 120 (e.g., a core case) and an outer case 122 (e.g., a fan case). The inner case 120 may house one or more of the engine sections 113A-115B; e.g., an engine core. The outer case 122 may house at least the fan section 112. The duct wall 30 for the measurement system 20 of FIG. 1 may be configured as part of any one of the engine cases 120, 122, or attached to any one of the engine cases 120, 122 or another stationary structure where the duct wall 30 is part of a blade outer air seal (BOAS), for example.

Each of the engine sections 112, 113A, 113B, 115A and 115B includes a respective bladed rotor 124-128. Each of these bladed rotors 124-128 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s). The bladed rotor 24 monitored by the measurement system 20 of FIG. 1 may be the fan rotor 124, the LPC rotor 125, the HPC rotor 126 or any other bladed rotor of the turbine engine 104.

The fan rotor 124 is connected to a geartrain 130, for example, through a fan shaft 132. The geartrain 130 and the LPC rotor 125 are connected to and driven by the LPT rotor 128 through a low speed shaft 133. The HPC rotor 126 is connected to and driven by the HPT rotor 127 through a high speed shaft 134. The shafts 132-134 are rotatably supported by a plurality of bearings 136; e.g., rolling element and/or thrust bearings. Each of these bearings 136 is connected to the engine housing 118 by at least one stationary structure such as, for example, an annular support strut.

During operation, air enters the turbine engine 104 through the airflow inlet 108. This air is directed through the fan section 112 and into a core flowpath 138 and a bypass flowpath 140. The core flowpath 138 extends sequentially through the engine sections 113A-115B. The air within the core flowpath 138 may be referred to as "core air". The bypass flowpath 140 extends through a bypass duct, which bypasses the engine core. The air within the bypass flowpath 140 may be referred to as "bypass air".

The core air is compressed by the LPC rotor 125 and the HPC rotor 126 and directed into a combustion chamber 142 of a combustor in the combustor section 114. Fuel is injected into the combustion chamber 142 and mixed with the compressed core air to provide a fuel-air mixture. This fuel-air mixture is ignited and combustion products thereof flow through and sequentially cause the HPT rotor 127 and the LPT rotor 128 to rotate. The rotation of the HPT rotor 127 and the LPT rotor 128 respectively drive rotation of the HPC rotor 126 and the LPC rotor 125 and, thus, compression of the air received from a core airflow inlet. The rotation of the LPT rotor 128 also drives rotation of the fan rotor 124, which propels bypass air through and out of the bypass flowpath 140. The propulsion of the bypass air may account for a majority of thrust generated by the turbine engine 104, e.g., more than seventy-five percent (75%) of engine thrust. The turbine engine 104 of the present disclosure, however, is not limited to the foregoing exemplary thrust ratio.

The measurement system 20 may be configured with various turbine engines other than the one described above as well as in other types of (e.g., rotational) equipment. The measurement system 20, for example, may be configured with a geared turbine engine where a geartrain connects one or more shafts to one or more rotors in a fan section, a compressor section and/or any other engine section. Alternatively, the measurement system 20 may be configured with a turbine engine configured without a geartrain. The turbine engine may have a single spool, two spools (e.g., see FIG. 5), or more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines or rotational equipment.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A measurement system, comprising:
   a probe assembly including a capacitance probe and an optical probe;
   the capacitance probe comprising a capacitance sensor that forms a sensor face of the probe assembly, wherein an aperture projects axially through the capacitance sensor to the sensor face; and
   the optical probe configured with an optical line of sight through the aperture into a volume adjacent the sensor face.

2. The measurement system of claim 1, further comprising a blade tip clearance measurement system comprising the capacitance probe.

3. The measurement system of claim 1, further comprising a blade time of arrival measurement system comprising the optical probe.

4. The measurement system of claim 1, wherein the aperture is coaxial with the capacitance sensor.

5. The measurement system of claim 1, further comprising:
   a bladed rotor; and
   a duct wall circumscribing the bladed rotor and forming an outer peripheral boundary of the volume;
   the probe assembly projecting through a port in the duct wall to the volume.

6. The measurement system of claim 1, further comprising:
   a wall forming a peripheral boundary of the volume;
   the probe assembly projecting through a port in the wall to the volume; and
   the capacitance sensor attached to the wall.

7. The measurement system of claim 6, wherein the capacitance sensor is clamped onto the wall.

8. The measurement system of claim 6, further comprising an insulator electrically decoupling the capacitance sensor from the wall.

9. The measurement system of claim 6, further comprising:
   a nut thread onto a threaded shaft of the capacitance sensor; and
   the wall captured axially between a head of the capacitance sensor and the nut.

10. The measurement system of claim 9, further comprising an electrical lead electrically coupled to the capacitance sensor through the nut.

11. The measurement system of claim 1, wherein
    the optical probe comprises an optical fiber at least partially defining the optical line of sight into the volume; and
    the optical fiber is disposed within the aperture.

12. The measurement system of claim 11, wherein the optical fiber projects axially across the capacitance sensor.

13. The measurement system of claim 11, wherein
    the optical probe further comprises a second optical fiber at least partially defining a second optical line of sight into the volume; and
    the second optical fiber is disposed within the aperture and adjacent the optical fiber.

14. The measurement system of claim 11, further comprising:
    an optical sheath covering a portion of the optical fiber;

the optical fiber projecting axially out from the optical sheath and into the capacitance sensor.

15. The measurement system of claim 14, further comprising:
a mount fixing the optical sheath to the capacitance sensor; and
the mount electrically isolating the optical sheath from the capacitance sensor.

16. A measurement system, comprising:
a blade tip clearance measurement system comprising a first probe, the first probe comprising a first probe sensor that forms a sensor face, wherein an aperture projects axially through the first probe sensor to the sensor face; and
a blade time of arrival measurement system comprising a second probe, the second probe projecting through the aperture to a volume adjacent the sensor face.

17. The measurement system of claim 16, wherein
the first probe is configured as a capacitance probe; and
the first probe sensor is configured as a capacitance sensor.

18. The measurement system of claim 16, wherein
the second probe is configured as an optical probe; and
the optical probe comprises an optical fiber projecting axially through the aperture and across the first probe sensor.

19. A measurement system, comprising:
a probe assembly including a capacitance probe, an optical probe and a housing structure;
the capacitance probe comprising a capacitance sensor housed within the housing structure; and
the optical probe comprising an optical fiber, and an end portion of the optical fiber housed with the capacitance sensor within the housing structure.

20. The measurement system of claim 19, wherein the capacitance sensor circumscribes the end portion of the optical fiber.

* * * * *